United States Patent [19]
Greene et al.

[11] Patent Number: 5,584,613
[45] Date of Patent: Dec. 17, 1996

[54] CARRIER AUTOMATIC BRAKING SYSTEM

[75] Inventors: Harold R. Greene, Farmers Branch; Michael J. Foreman, Carrollton, both of Tex.

[73] Assignee: ComCo Systems, Dallas, Tex.

[21] Appl. No.: 621,072

[22] Filed: Mar. 22, 1996

[51] Int. Cl.$^6$ .................................................. B65G 51/20
[52] U.S. Cl. ............................... 406/19; 406/22; 406/112
[58] Field of Search ............................ 406/19, 22, 110, 406/111, 112, 147, 176

[56] References Cited

U.S. PATENT DOCUMENTS

| | | | |
|---|---|---|---|
| 2,698,721 | 1/1955 | Otteren | 243/19 |
| 3,237,881 | 3/1966 | Grosswiller et al. | 406/19 |
| 3,306,555 | 2/1967 | Tonne | 406/110 |
| 3,711,038 | 1/1973 | Van Otteren | 406/19 |
| 4,180,354 | 12/1979 | Greene | 406/112 |
| 4,325,660 | 4/1982 | Jones | 406/84 |
| 4,407,613 | 10/1983 | Jones | 406/112 |
| 4,941,777 | 7/1990 | Kieronski | 406/13 |
| 4,984,939 | 1/1991 | Foreman et al. | 406/112 |
| 5,147,154 | 9/1992 | Scott | 406/112 |
| 5,304,017 | 4/1994 | Vogel et al. | 406/111 |

FOREIGN PATENT DOCUMENTS

| | | | |
|---|---|---|---|
| 0045626 | 7/1981 | European Pat. Off. . | |
| 1281359 | 4/1966 | Germany | 406/110 |
| 1234630 | 2/1967 | Germany | 406/112 |
| 1005129 | 6/1964 | United Kingdom . | |
| 1044198 | 8/1964 | United Kingdom . | |
| 2251840 | 7/1992 | United Kingdom | 406/112 |

*Primary Examiner*—Gary C. Hoge
*Attorney, Agent, or Firm*—Sidley & Austin

[57] ABSTRACT

A pneumatic transmission system having a carrier automatic braking system contains a transport conduit having a first end and a second end and being capable of permitting the transfer of a carrier therethrough, a first station for sending and receiving a carrier located on one end of the transmission conduit and a second station for sending and receiving a carrier located on the other end of the transmission conduit. A pair of motor blowers, each capable of moving a volume of air in opposing directions through a conduit, are enclosed within a supply branch which is connected to one of the stations. The first motor blower blows air to move the carrier from one station to the other. The second motor blower is activated, to operate concurrently with the first motor blower, when the carrier is detected some predetermined location along the transport conduit. The opposing motors create an air block between the first and second motor blowers which prohibits air from entering or exiting the conduit on the air block side of the carrier as the carrier moves along the transport conduit. The change in differential pressure across the carrier slows the carrier as it approaches its destination station.

13 Claims, 2 Drawing Sheets

5,584,613

CARRIER AUTOMATIC BRAKING SYSTEM

FIELD OF THE INVENTION

This invention is directed generally to a pneumatic transmission system for transmitting a carrier between two points. Specifically, this invention relates to a system for braking a carrier in a pneumatic transmission system, as the carrier approaches its destination point. In one aspect, this invention relates to a transmission system having at least one open terminal or station and utilizing one blower to transmit the carrier toward its destination point and a second opposing blower, which is activated for a predetermined period of time while the first blower remains on to create an air block to thereby slow the carrier as the carrier approaches its destination point.

BACKGROUND OF THE INVENTION

Pneumatic transmission systems are widely known and are used to transmit articles from one place to a remote location. Pneumatic transmission systems usually include at least two stations, a tube or conduit extending between the two stations, and a carrier positioned within the tube so as to be delivered by pneumatic pressure. The pressure can be a superatmospheric pressure or a subatmospheric pressure.

A common use for a pneumatic transmission system is in drive-in bank teller facilities where business is conducted via a carrier transmitted between the bank and the remote drive-in terminal. Other uses include sending documents between different floors in a building, or from one office to another office located some distance apart.

An example of a conventional pneumatic transmission system that used a pair of blowers is shown in FIG. 1. A first station 30 and a second station 35 are connected by a transmission tube 40. A first blower 10 is located at the first station 30 and can pressurize the air behind a carrier 45, thereby creating enough differential pressure (ΔP) across the carrier 45 to push the carrier 45 upwardly from station 30, then along the horizontal section of the tube 40 to the second station 35. Similarly, the second blower 20, which is located at the second station 35, can pressurize the air behind the carrier 45 and send the carrier 45 in the opposite direction toward the first station 30. In one such system, the blowers were a pair of vacuum cleaner motors which were physically and electrically isolated from each other so that each blower 10 and 20 was operated independently of the other blower. The first blower 10 can be turned on by actuating a first mechanical switch 15, sending a carrier 45 from the first station 30 to the second station 35. The second blower 20 can be turned on by actuating a second mechanical switch 25 to send a carrier 45 from the second station 35 to the first station 30. If a first carrier 45 was inserted in the first station 30 and the blower 10 was turned on and then a second carrier 45 was inserted in the second station 35 and the blower 20 was turned on while the first carrier 45 was in transit, thereby placing two carriers in the transmission tube 40 simultaneously, the movements of the two carriers 45 would be blocked until one of the blowers 10 or 20 was turned off, at which time both carriers would proceed in the direction dictated by the blower which remained on.

In many pneumatic transmission systems, the carrier would travel through the tube and impact a stop device once it had reached its intended destination. In such systems the carrier can travel at speeds of 15–20 feet/second or higher, and the impact of the carrier against the stop device can cause great wear on both the carrier and the system as well as damage the contents of the carrier.

One method for obviating the high velocity impact between the carrier and the stop device has employed the use of an air cushion adjacent to the receiving terminal, as illustrated in FIG. 2. The air cushion is created by pneumatically sealing the receiving terminal 50 (making it a closed terminal) and providing a vent 65 (or check valve) in the tube 75 a short distance from the receiving terminal 50 such that when the carrier 70 passes the vent 65 in an approach to the receiving terminal 50, a trapped column of air is created in the approach leg 55 of the tube 75 which serves to decelerate or "cushion" the carrier 70 as the carrier 70 makes its final approach to the receiving terminal 50. The check valve 65 is opened to the atmosphere either directly, or through a conduit 60 as shown. However, such an air cushion system requires that the receiving terminal have a door capable of pneumatically sealing the terminal. The system operator must then manually open the terminal door in order to retrieve the carrier from the system. Alternatively, a complicated mechanism can be provided to automatically open the terminal door upon the arrival of the carrier. However, such mechanisms are often costly and prone to mechanical failures at inopportune times.

This form of operation is well known in the art of pneumatic systems. However, slowing down a carrier is not this simple when the destination station is an open air station. There is no dead column of air when the station is open to the atmosphere because the air in front of the carrier is exhausted out of the open station. Therefore, there is no pressure build up in front of the carrier and there is no slowing force to act upon the carrier.

Other attempts to resolve the high impact problem have included the use of other trigger means to shut off the stream of air. These alternative trigger means include such items as a photocell, a timing device, a limit switch, a spring catch, and combinations thereof.

An alternative system in which a carrier is decelerated prior to entering an open terminal is disclosed in U.S. Pat. No. 4,180,354 to Greene. U.S. Pat. No. 4,180,354 discloses a transmission system in which the pressurized air behind the carrier is routed principally through a check valve positioned near the open terminal to allow the carrier sufficient time to decelerate before discharging into an open terminal. An adjustable valve allows some air to continue to push the carrier to the terminal. A secondary air line adjacent to the open terminal draws in the air from the main transmission line and reroutes it to the blower, thus avoiding the blowing of air through the open terminal. The carrier is decelerated by simply choking off most of the air behind it at a point near the open terminal so that the carrier ejects with a minimum speed from the transmission line into the open terminal. The above cited system is a way to slow a carrier as it approaches an open destination terminal. However, this system requires multiple routing conduits and an adjustable valve to achieve the desired result.

Still another alternative system in which a carrier is decelerated prior to entering an open terminal is disclosed in U.S. Pat. No. 4,984,939 to Foreman et al. This patent discloses the use of one pressure blower and one vacuum blower, wherein the vacuum blower is operated at an equal or greater capacity than the pressure blower. The pressure blower and vacuum blower are attached to the transmission conduit by air tubes at different locations along the transmission conduit. In this system, a carrier is sent from a first station to a second station by activating the pressure blower at a certain capacity to create a ΔP across the carrier thereby moving it out of the first station, through the transmission conduit and toward the second station. The vacuum blower is attached to the transmission conduit at some point near the second station. As the carrier approaches the second station, the carrier is slowed by the counter flow of air due to the vacuum blower. The vacuum blower sucks air out of the transmission conduit behind the carrier at an equal or greater capacity than the pressure blower, which reverses the ΔP across the carrier and slows the carrier as the carrier makes its final approach to the open terminal.

As mentioned above, this system requires multiple transmission conduits and precise timing in order to operate effectively.

Conventional pneumatic transmission systems are also used in multi-station configurations, such as in a hospital. In these systems, one central station, a laboratory for example, sends a carrier to any one of many receiving stations such as nurse stations. The cargo inside the carrier in these systems can be fragile. Therefore, it is advantageous to allow the carrier to enter the open stations at a low rate of speed in order to maintain the integrity of the cargo. Conventional multistation pneumatic transmission systems currently have to use a slide gate at each station in order to achieve this result. The slide gate is a combination of a door and a motor, which is activated as the carrier enters the particular station. Upon approach of the carrier, the motor is activated and the slide gate positions itself inside the transmission conduit. The slide gate effectively closes the transmission conduit in front of the carrier, thereby forming a dead column of air in front of the carrier. The carrier is slowed as it falls on the dead column of air, and finally comes to rest on the slide gate. The slide gate is then removed from the transmission conduit, allowing the carrier to drop into the open station.

The problems associated with the above described conventional multi-station pneumatic transmission systems include, among other things, the cost of numerous slide gates and the lack of reliability due to the use of additional moving parts.

SUMMARY OF THE INVENTION

The present invention is a new and advantageous system and method for braking a carrier in a pneumatic transmission system as the carrier approaches its destination terminal. The pneumatic transmission system of the present invention includes at least a first station and a second station, a transport conduit connected to each of the first and second stations, a supply/exhaust branch conduit connected to the first station, a pair of motor driven blowers positioned in the supply exhaust/branch conduit, a controller, and a sensor associated with the transport conduit at a location a predetermined distance away from the second station.

The present invention can be implemented in a multistation pneumatic transmission system. The use of the present invention would eliminate the need for slide gates at all of the receiving stations as described above with respect to a conventional multi-station pneumatic transmission system.

The first blower is activated to move a carrier from the first station to the second station via the transport conduit. The sensor detects the presence of the carrier in the transport conduit as the carrier passes the sensor location and the sensor then signals the controller. The controller receives the signal from the sensor and, in turn, activates the second blower while the first blower continues to operate, to thereby create an air block between the two blowers. The air block creates a situation where the (ΔP) across the carrier in the transport conduit decreases, and is preferably reversed, to thereby slow the carrier as the carrier makes its final approach to the second station.

A method for braking a carrier, in a pneumatic transmission system, as the carrier approaches a receiving station includes the steps of activating a first blower for moving air in a first direction to thereby transmit the carrier from a transmitting station toward the receiving station via a transport conduit, sensing the presence of the carrier at a location along the transport conduit, and upon sensing the presence of the carrier at said location, activating a second blower for a predetermined time while the first blower is still activated, for moving air in a second direction opposite to the first direction of air movement, thereby decreasing, and preferably reversing, the ΔP across the carrier.

DETAILED DESCRIPTION OF THE DRAWINGS

Figure 1:
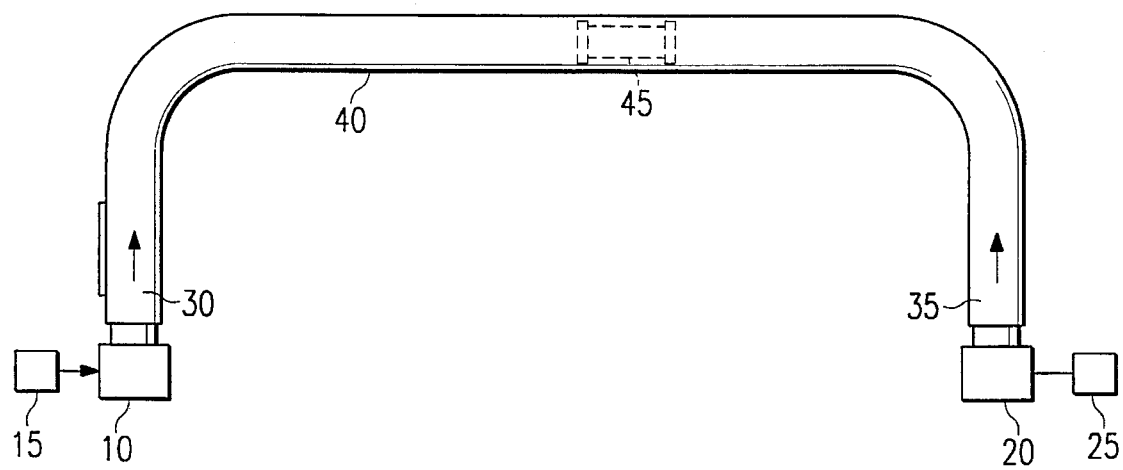
FIG. 1 is a block diagram illustrating a conventional pneumatic transmission system utilizing a pair of vacuum cleaner motor blowers.
Figure 2:
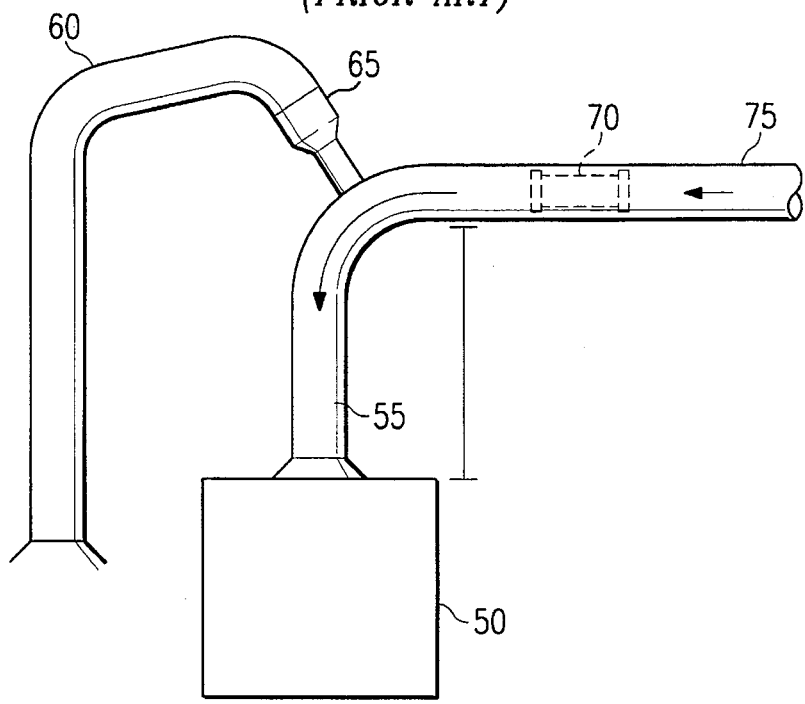
FIG. 2 is an illustration of a conventional braking system used when the destination station is closed to the atmosphere.
Figure 3:
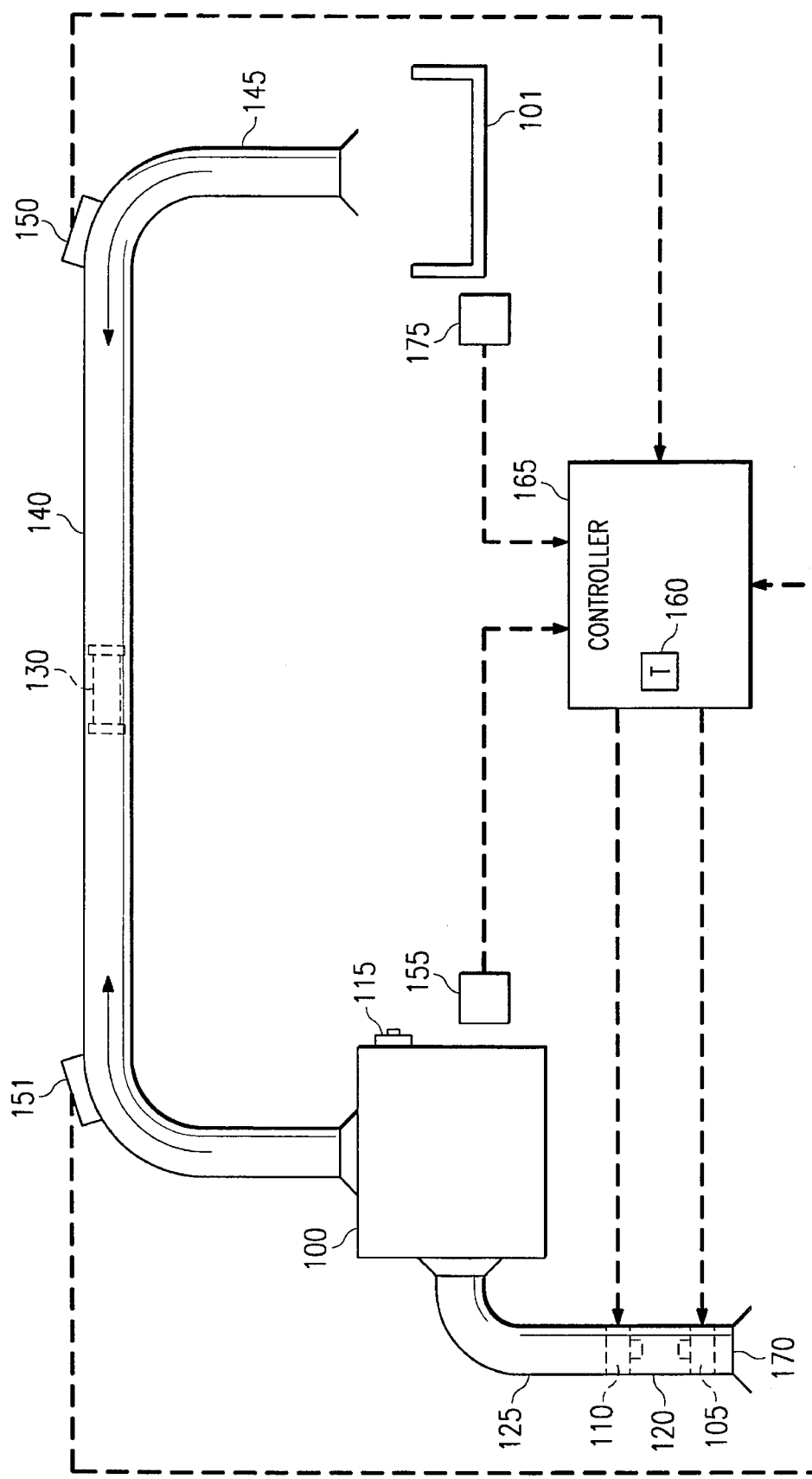
FIG. 3 is a schematic illustration of a pneumatic transmission system containing a preferred embodiment of a carrier automatic braking system in accordance with the present invention.

FIG. 3 illustrates a pneumatic transmission system containing a preferred embodiment of a carrier automatic braking system in accordance with the present invention. The present system comprises a station 100 and a station 101 connected by a substantially air tight transport tube 140, which is open to the atmosphere at station 101, with a pair of vacuum cleaner motor blowers 105 and 110 being positioned within a supply/exhaust branch 120 which is connected to station 100. The supply/exhaust branch 120 includes a conduit 125 which is substantially airtight and a vent/inlet 170 which is open to the atmosphere and can provide air from the atmosphere to the pneumatic transmission system or can allow the exhaust of air from the pneumatic transmission system to the atmosphere. Conduit 125 does not have to be of a similar internal diameter as tube 140 because no carrier is transported therethrough, only air. The vacuum cleaner motor blowers 105 and 110 are positioned within the supply/exhaust branch 120 in series with each other, meaning the vacuum cleaner motor blowers 105 and 110 are within the same air flow path. Furthermore, the vacuum cleaner motor blowers 105 and 110 are spatially separated from each other within said supply/exhaust branch 120. The supply/exhaust branch 120 is connected to station 100 at one end and open to the atmosphere at vent/inlet 170 for supplying or exhausting air. Station 100 can be a closed station, meaning that it can be sealed by closing a door 115 so that, except for the supply/exhaust branch 120, it is substantially closed to the atmosphere during transport of a carrier 130. Station 101 can be either a closed station with a vent or a station which is open to the atmosphere during transport of the carrier 130, but it is shown as an open station for the purpose of this preferred embodiment. The carrier 130 is capable of being filled with items to be transferred and is inserted at either station for transfer to the other station.

The transport tube 140, which is connected to station 100 at one end and to station 101 at its other end, is of sufficient internal diameter such that the carrier 130 can be transmitted therethrough. Transport tube 140 can have any spatial orientation and can include curved portions, straight portions, vertical portions, and horizontal portions, dependent upon the circumstances under which the system is going to be used. For example, the approach leg 145 is shown as a curve from a horizontal direction to a vertical downward direction. However, this approach leg 145 can also remain horizontal or curve in a vertical upward direction as it connects with station 101. The transport tube 140 and the carrier 130 can have nearly any desired dimension and cross-section, dependent on the system needs. The transport tube 140 can include any transmission line of any cross-sectional form having a pneumatic channel formed therethrough.

To send the carrier 130 from station 100 to station 101, the first motor blower 105 is activated during the transfer phase of the cycle to intake air through the vent/inlet 170 and to apply pressurized air to the carrier 130, which creates a ΔP across the carrier 130 and moves the carrier 130 upwardly, out of station 100, and then horizontally through the tube 140 toward station 101. The motor blower 105 can generate approximately 5 psig behind the carrier 130. Likewise, to send the carrier 130 from station 101 to station 100, the second motor blower 110 would be activated instead of the first motor blower 105, to exhaust air through the vent/inlet 170, thereby creating a vacuum in the tube 140 on the station 100 side of the carrier 130, while the station 101 side of the carrier 130 remains at 0 psig because it is open to the atmosphere. This ΔP across the carrier 130 generates a force moving the carrier 130 in the opposite, or station 100 direction.

In order to send the carrier 130 from station 100 to station 101, the carrier 130 is placed in the tube 140 and the door 115 is shut and sealed. The first motor blower 105 is then activated. This can be done by an operator actuating a switch 155, which is coupled to a controller 165. The controller 165 is coupled to the first motor blower 105 and to the second motor blower 110 for selective activation of the blowers 105 and 110. When switch 155 is actuated the switch 155 sends a control signal to the controller 165. The controller 165 receives the control signal from the switch 155 and provides a control signal to the first motor blower 105, to thereby activate the first motor blower 105. The controller 165 is also coupled to a sensor 150 which is positioned near or on the transmission tube 140. The sensor 150 does not need to be in physical contact with the transmission tube 140, but it must be positioned such that it is able to sense the carrier 130 as the carrier passes a predetermined location in the transmission tube 140 related to the approach of the carrier 130 to the station 101. The present invention is not limited to an electrical coupling, or even a physical connection between the controller 165 and its peripherals.

The motor blower 105 blows air through supply/exhaust branch 120 and conduit 125 to the first station 100 and creates a ΔP across the carrier 130 moving it towards station 101. The motor blowers used in the preferred embodiment can be standard vacuum cleaner motor blowers such as Model No. 115923 manufactured by Ametek Lamp. Vacuum cleaner motor blowers 105 and 110 are substantially equal in size and in output capacity, although mounted in opposite directions. These vacuum cleaner motor blowers 105 and 110 are capable of operating at approximately 23000 RPM and of generating approximately 124 CFM.

As the carrier 130 moves through the tube 140, it reaches the portion of the tube 140 where it is detected by the sensor 150. The sensor 150 detects the presence of the carrier 130 as it passes a predetermined location in the transmission tube 140 and provides a control signal to the controller 165 indicative of that detection. The controller 165 receives this control signal from the sensor 150 and provides a control signal to the second motor blower 110 to thereby activate the second motor blower 110, while the first motor blower 105 remains activated, and to start the timer 160. The timer 160 can be an external peripheral device or it can be integrated in the controller 165. In this preferred embodiment, timer 160 is preferably a Model No. RTE B21 manufactured by IDEC. Now both motor blowers 105 and 110 are on at the same time. The opposing motor blowers 105 and 110 are positioned so that both blow air at each other, thereby building up the pressure between the two motor blowers 105 and 110 in the supply/exhaust branch 120, or both blow air away from each other, thereby causing a drop in the pressure between the two motor blowers 105 and 110. In either case, the opposing actions of the two motor blowers 105 and 110 create an air block which effectively prevents air from passing through the conduit 125 in either direction. The air block pressure between the two motor blowers 105 and 110 can build up to approximately 3 psig when the two motor blowers 105 and 110 blow air towards each other.

Once the air block is on, a finite amount of air remains in the tube 140 between the carrier 130 and the station 100 because no additional air can get through the air block between the motor blowers 105 and 110 in either direction. As the carrier 130 continues to move through the tube 140 toward the station 101, the volume of the portion of the tube 140 between the air block and the carrier 130 increases, and as that volume increases, the air pressure in the tube 140 behind the carrier 130 decreases because the amount of air between the air block and the carrier 130 remains substantially constant. The pressure on the station 101 side of the carrier 130, however, is substantially constant at 0 psig because the station 101 is open to the atmosphere. Therefore, as the pressure between the air block and the carrier 130 decreases as the carrier 130 moves through the final approach section 145 of the tube 140, the carrier 130 slows down due to the decreasing ΔP across the carrier 130. In a presently preferred embodiment, the carrier 130 reaches a point along the tube 140 where the pressure behind the carrier 130 decreases to a value less than the 0 psig in front of the carrier 130. This reversal of the ΔP across the carrier 130 creates a force in the direction of station 100, thereby further slowing the carrier 130 as the carrier 130 approaches station 101. When the predetermined time has elapsed, as noted by the timer 160, the controller 165 deactivates the first motor blower 105 to stop the flow of air in the direction of the destination station 101. The controller 165 then deactivates the second motor blower 110. The time that the motor blower 110 is on and the motor blower 105 is off causes a brief final restraining force on the carrier 130 as the carrier 130 enters the station 101. The second motor blower 110 is promptly turned off so as to prevent the reversal of the direction of movement of the carrier 130. While the first motor blower 105 is shut off first in this embodiment, it may be necessary or desirable to shut off the second motor blower 110 before or even simultaneously with the shutting off of the first motor blower 105, depending on the circumstances of the particular transmission system.

In order to send the carrier 130 from station 101 to station 100 an operator activates the second motor blower 110. This can be done by an operator actuating a second switch 175, which is coupled to controller 165. The motor blower 110 intakes air from the transport tube 140 and exhausts that air through vent/inlet 170 which lowers the pressure in the transport tube 140 and creates a ΔP across the carrier 130 moving it towards station 100.

As the carrier 130 moves through the tube 140, it reaches the portion of the tube 140 where it is detected by the sensor 151. The sensor 151 detects the presence of the carrier 130 as it passes a predetermined location in the transmission tube 140 and provides a control signal to the controller 165 indicative of that detection. The controller 165 receives this control signal from the sensor 151 and provides a control signal to the first motor blower 105 to thereby activate the first motor blower 105, while the second motor blower 110 remains activated, and to start the timer 160. Now both motor blowers 105 and 110 are on at the same time thereby forming an air block as described above.

Once the air block is on, a finite amount of air remains in the tube 140 between the carrier 130 and the station 100 because no additional air can get through the air block between the motor blowers 105 and 110 in either direction. As the carrier 130 continues to move through the tube 140 toward the station 100, the volume of the portion of the tube 140 between the air block and the carrier 130 decreases, and as that volume decreases, the air pressure in the tube 140 in front of the carrier 130 (station 100 side) increases because the amount of air between the air block and the carrier 130 remains substantially constant and it is being compressed into a smaller volume. The pressure on the station 101 side of the carrier 130, however, is substantially constant at 0 psig because the station 101 is open to the atmosphere. Therefore, the ΔP across the carrier 130 decreases as the carrier 130 moves toward the station 100 and the carrier 130 slows down due to the decreasing ΔP across the carrier 130.

The carrier 130 reaches a point along the tube 140 where the pressure in front of the carrier 130 increases to a value greater than the 0 psig behind of the carrier 130. This reversal of the ΔP across the carrier 130 creates a force in the direction of station 101, thereby further slowing the carrier 130 as the carrier 130 approaches station 100. When the predetermined time has elapsed, as noted by the timer 160, the controller 165 deactivates the second motor blower 110. The controller 165 then deactivates the first motor blower 105. The time that the motor blower 105 is on and the motor blower 110 is off causes a brief final restraining force on the carrier 130 as the carrier 130 enters the station 100. The first motor blower 105 is promptly turned off so as to prevent the reversal of the direction of movement of the carrier 130. While the second motor blower 110 is shut off first in this embodiment, it may be necessary or desirable to shut off the first motor blower 105 before or even simultaneously with the shutting off of the second motor blower 110, depending on the circumstances of the particular transmission system.

While a preferred embodiment of the present invention has been described, with respect to a certain preferred embodiment, it should be apparent to those skilled in the art that it is not so limited. Various other modifications may be made without departing from the spirit and scope of the invention. It is intended that the following claims be interpreted to embrace all such variations and modifications.

What is claimed:

1. A pneumatic transmission system, comprising:

a first station for sending or receiving a carrier;

a second station for sending or receiving a carrier;

a transport conduit connected between said first and second stations, wherein said transport conduit is capable of permitting the transfer of a carrier between said first and second stations;

a supply/exhaust branch connected to said first station such that air can flow between said supply/exhaust branch and said first station, said supply/exhaust branch having an opening which can serve as an air inlet for providing air from the atmosphere through said supply/exhaust branch to the pneumatic transmission system and as an air vent for exhausting air from the pneumatic transmission system through the supply/exhaust branch to the atmosphere;

a first motor blower positioned within said supply/exhaust branch, wherein said first motor blower is capable of moving a volume of air through said supply/exhaust branch and said transport conduit in a first direction; and a second motor blower positioned in series with said first motor blower within said supply/exhaust branch, adjacent to and opposite said first motor blower, wherein said second motor blower is capable of moving a volume of air through said supply/exhaust branch and said transport conduit in a second direction which is opposite to said first direction;

a sensor associate with said transport conduit so that said sensor is capable of detecting the presence of a carrier at a predetermined location in said transport conduit associated with an approach of said carrier to one of said first station and said second station and of generating a control signal in response to a detection of said carrier by said sensor;

a controller coupled to said sensor and to said first and second motor blowers, wherein said controller activates said first motor blower to move said carrier from one of said first station and said second station to the other one of said first station and said second station and then activates said second motor blower in response to said control signal from said sensor, indicating the detection of said carrier at said predetermined location, while said first motor blower is still activated, to thereby form an air block between said first and second motor blowers to decrease the differential pressure across said carrier and cause said carrier to slow down as it approaches said other one.

2. A pneumatic transmission system in accordance with claim 1 wherein said first station apart from said supply/exhaust branch can be substantially closed to the atmosphere, and wherein said second station is open to the atmosphere.

3. A pneumatic transmission system in accordance with claim 2 further comprising a timer capable of providing a timing control signal when a predetermined amount of time has elapsed, and wherein said controller activates said timer in response to the detection of said carrier at said predetermined location in said transport conduit associated with an approach of said carrier to said second station and said controller deactivates said first and second motor blowers in response to said timing control signal.

4. A pneumatic transmission system in accordance with claim 3 wherein said second motor blower is positioned in series with said first motor blower within said supply/exhaust branch, adjacent to and opposite said first motor blower and spatially separated from said first motor blower, wherein said first and second motor blowers move air through the same air path within said supply/exhaust branch.

5. A pneumatic transmission system in accordance with claim 4 further comprising a start button coupled to said controller, wherein said start button can be manually actuated to provide a start control signal to said controller for activating said first motor blower to transmit said carrier from said first station to said second station.

6. A pneumatic transmission system in accordance with claim 5 further comprising a second start button coupled to said controller, wherein said second start button can be manually actuated to provide a second start control signal to said controller for activating said second motor blower to transmit said carrier from said second station to said first station.

7. A pneumatic transmission system in accordance with claim 2 wherein said transport conduit is a pneumatic tube which is substantially sealed from the atmosphere.

8. A pneumatic transmission system in accordance with claim 2 wherein said transport conduit terminates at said second station in a vertically downward direction.

9. A pneumatic transmission system in accordance with claim 1 wherein said activation of said second motor blower while said first motor blower is activated forms an air block between said first and second motor blowers to reverse the differential pressure across said carrier as said carrier approaches said second station.

10. A method for slowing a carrier in a pneumatic transmission system as said carrier approaches a destination point, comprising the steps of:

(a) activating a first motor blower to move air through a supply/exhaust branch and a transport conduit in a first direction, to thereby create a differential pressure across a carrier and transmit said carrier from a first station toward a second station via said transport conduit;

(b) sensing the presence of said carrier at a predetermined location along said transport conduit, wherein said predetermined location is associated with the transmission of said carrier from said first station to said second station;

(c) activating a second motor blower for a predetermined amount of time to move air in a second direction which is opposite to said first direction, thereby creating an air block between said first and second motor blowers so as to reduce the value of the differential pressure across said carrier as said carrier makes a final approach to said second station.

11. A method for slowing a carrier in a pneumatic transmission system in accordance with claim 10 wherein said step of activating said second motor blower creates an air block so as to reverse the value of the differential pressure across said carrier as said carrier makes a final approach to said second station.

12. A method for slowing a carrier in a pneumatic transmission system in accordance with claim 10, further comprising the step of activating a timer after said sensing step, whereby said timer is set to a predetermined time period and generates a control signal when said predetermined time period has elapsed.

13. A method for slowing a carrier in a pneumatic transmission system in accordance with claim 10, further comprising the steps of:

(d) deactivating said first motor blower to thereby eliminate the moving of air in said first direction caused by said first motor blower; and (e) deactivating said second motor blower to thereby eliminate the moving of air in said second direction caused by said second motor blower.

\* \* \* \* \*